United States Patent [19]

Close

[11] 3,763,966

[45] Oct. 9, 1973

[54] PARKING BRAKE FOR A CART OR THE LIKE

[76] Inventor: James Garth Close, 3215 29th St., P.O. Box 3096, Lubbock, Tex.

[22] Filed: Feb. 25, 1972

[21] Appl. No.: 229,302

[52] U.S. Cl.................................. 188/5, 188/19
[51] Int. Cl............................................. B60t 1/14
[58] Field of Search........................... 185/5, 19, 20

[56] References Cited
UNITED STATES PATENTS

| | | | |
|---|---|---|---|
| 2,333,450 | 11/1943 | Staley | 188/5 UX |
| 2,851,126 | 9/1958 | Ward | 188/5 |
| 3,288,250 | 11/1966 | Oja et al. | 188/5 |

*Primary Examiner*—Duane A. Reger
*Attorney*—John F. Booth

[57] ABSTRACT

A manually operable ground engaging brake for use on wheeled vehicles such as merchandise carts, baby carriages, wheel chairs, or the like, which can be selectively engaged by the operator to park or anchor the cart as desired to hold the cart in place on an inclined surface or in a strong wind or the like.

5 Claims, 5 Drawing Figures

PATENTED OCT 9 1973 3,763,966

PARKING BRAKE FOR A CART OR THE LIKE

BACKGROUND OF THE INVENTION

The present invention relates to an improved brake for parking or anchoring a wheeled vehicle, such as merchandise carts and the like to prevent the vehicle from rolling down an incline or being blown across a level surface and causing damage or injury, and more particularly, to an improved brake of the type which is selectively manually operable to engage the ground surface. The brake is designed so that it fits numerous vehicle shapes and sizes and is easily engaged by the hand of the operator of the vehicle.

DESCRIPTION OF THE PRIOR ART

The manufacturers and users of wheeled vehicles such as merchandise carts, baby carriages, wheel chairs, luggage carts, hand trucks, building scaffolds, and the like have long recognized the risk of damage to property and injury to individuals by these vehicles moving uncontrolled at an undesired excessive speed and colliding with persons or property causing injury and/or damage.

The risk of damage or injury is especially present in the use of merchandise carts which are provided by supermarkets or other types of retail stores for the customers' use during their shopping tour to transport merchandise about the store and to the customers' automobiles in the parking lot where the merchandise is unloaded into the automobiles, and the cart is left unattended at the unloading site. In many instances, these parking lots are constructed on an incline due to the terrain and for purposes of drainage, and when a cart is allowed to move unrestrained down the incline, damage to cars parked in the parking lot can result or even injury to individuals walking in the parking lot may occur. Also, even in parking lots constructed on a flat terrain, strong gusty winds can propel the carts across the lots at speeds sufficient to cause damage and injury to property and individuals.

To eliminate these problems, numerous configurations of brakes have been proposed in the prior art. One type of conventional brake comprises a mechanism which prevents rotation of one or more wheels of the cart and is actuated and controlled by a lever or bar located on the cart adjacent the portion of the cart which is controlled by the hands of the customer during the pushing of the cart. These apparatus are of the type which are constantly in a condition to apply a braking or retarding force to the wheels of the cart unless a bar or control lever is held in a deactuated position by a customer. Although this type of brake has served its purpose, it has not proved entirely satisfactory under all conditions of service for the reason that in some cases it is inconvenient if not impossible for the customer to manually hold the brake in a deactuated position during the moving of the cart for the reason that in many instances the customers' hands are occupied examining merchandise or guiding the activities of small children in the store. Also, in some instances, the customer will push the cart through the store, unaware that the brake is actuated, thus causing the friction between the nonrotating wheel and the floor to wear a flat spot on the wheel, thus prematurely causing the wheel to need replacement. These brakes, in many instances, suffer from the structural disadvantage of being complicated and difficult to install and thus due to the numerous shapes and configurations of carts are not universally usable.

Another type of brake which has been utilized in the past are those brakes known as the "kick brakes." These brakes are the type which are mounted directly on the wheel and engaged by the foot of the operator to either lift the wheel off the ground or lock a wheel to prevent rotation thereof. Although these brakes have been operational to park the cart, they have not proved entirely satisfactory because they are difficult for the customer to locate and reach to operate, and therefore have a tendency to be left unused by the customer ignorant of their presence. Also, these brakes suffer from the same disadvantages of excessive wheel wear as the brakes which lock the wheels of a cart.

SUMMARY OF THE INVENTION

The general purpose of the present invention is to provide an improved braking mechanism for wheeled vehicles, such as merchandise carts or the like, which embraces all the advantages of similarly employed prior art devices yet possesses none of the aforementioned disadvantages. To attain this, the present invention contemplates the use of a unique, improved brake mechanism which mounts on the side of the vehicle and is hand operated to selectively engage the ground surface to park or anchor the vehicle in place.

OBJECTS OF THE INVENTION

It is therefore an object of the present invention to provide an improved manually operable parking brake for a wheeled vehicle or the like.

Another object of the present invention is the provision of an improved brake for a wheeled vehicle which remains engaged until disengaged by the operator.

An additional object of the present invention is the provision of an improved brake for a wheeled vehicle which does not lock one of the wheels to prevent rotation thereof.

Another object of the present invention is the provision of an improved brake for a wheeled vehicle which can be used on carts having swivel wheels.

A further object of the invention is the provision of an improved brake for a wheeled vehicle which is simple and inexpensive to manufacture and install.

Other objects and many of the attendant advantages of this invention will be readily appreciated by those of ordinary skill in the art as the same becomes better understood by reference to the following detailed description when considered in connection with the accompanying drawings, in which:

DESCRIPTION OF THE PREFERRED EMBODIMENT

Figure 1:
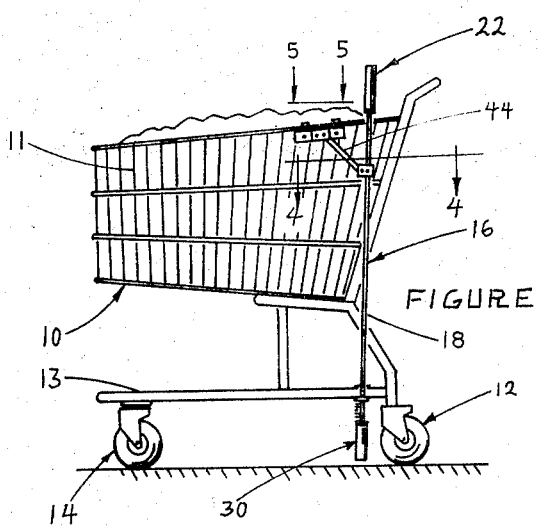
FIG. 1 illustrates a side elevation view of a merchandise cart with the improved brake of the present invention installed thereon in the nonactuated condition.

Referring now to the drawings wherein like reference characters designate like or corresponding parts throughout, there is illustrated for purposes of description of the present invention, a fully loaded merchandise or shopping cart 10. This merchandise cart 10 is of a type normally available to customers of supermarkets and large department stores for use in transporting merchandise, but it is to be understood, of course, that the word cart as used herein is used in a generic sense meaning a wheeled vehicle, and that the brake of the present invention could be applied to other types of vehicles. The merchandise cart 10 is illustrated with a basket portion 11 and an undercarriage structure 13 on which is mounted a pair of rear wheel assemblies 12 and a pair of front wheel assemblies 14 which support the cart and allow it to roll across the floor of a supermarket or store. The rear wheel assemblies 12 can be of the non-swiveling type, as illustrated, or can be of the swiveling type as are the front wheel assemblies 14.

In the present embodiment, a brake assembly 16 is attached to one side of the cart 10, but it is apparent from the following description that the improved brake of the present invention could be applied to the sides of other types of vehicles. The brake assembly 16 is shown in FIG. 1 in its deactuated position with the brake foot not engaging the surface of the floor, while the brake assembly 16 in FIG. 2 is shown in its actuated position with the brake foot engaging the surface of the floor to resist and retard movement of the cart 10.

Figure 5:
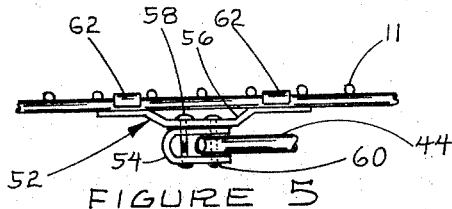
FIG. 5 illustrates an enlarged view of a portion of the device, looking in the direction of the arrows 5—5 in FIG. 1.
Figure 4:
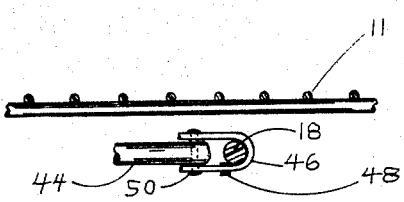
FIG. 4 illustrates an enlarged section of a portion of the device taken on line 4—4 of FIG. 1, looking in the direction of the arrows.
Figure 3:
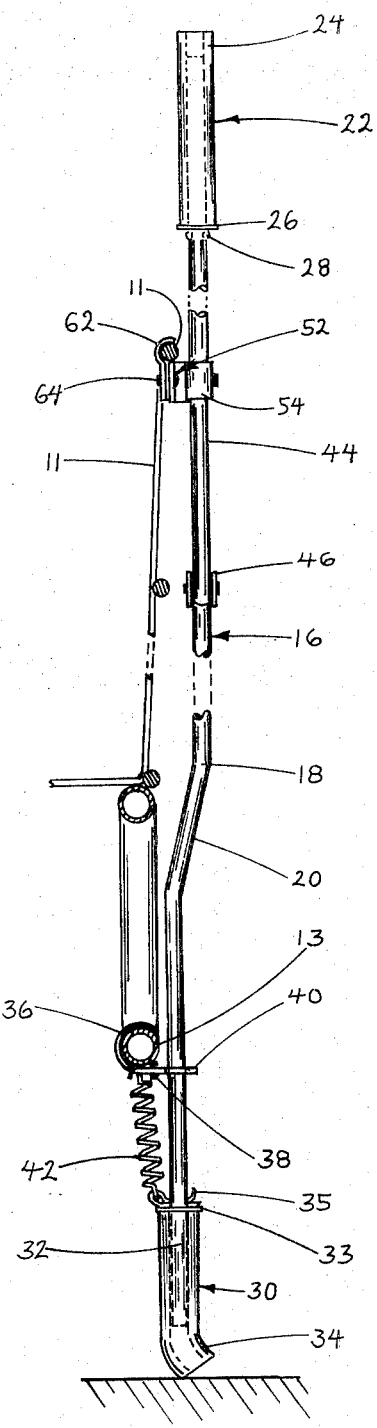
FIG. 3 illustrates an enlarged sectional view of the device taken on line 3—3 of FIG. 2, looking in the direction of the arrows.

Details of the mounting and structure of the improved brake 16 are illustrated in FIGS. 3, 4, and 5 as having a movable brake body portion 18 formed from an elongated rod. The body 18 is bent at 20 to allow the body to extend along the side of the basket portion 11 and the off-set undercarriage assembly 13 as shown. A handle portion 22 for gripping the brake 16 to actuate same is formed on the upper end of the body 18 by inserting the body 18 into an elongated tube 24. In the present embodiment, common rubber hose has been used, but it is to be understood, of course, that other types of handle assemblies commercially available in the market could be used. The correct position of the tube 24 is maintained on the body 18 by means of a collar or washer 26 which is positioned over the body 18 to rest against a deformed area 28 in the body. In this manner, the tube 24 is prevented from sliding down along the body portion 18.

Figure 2:
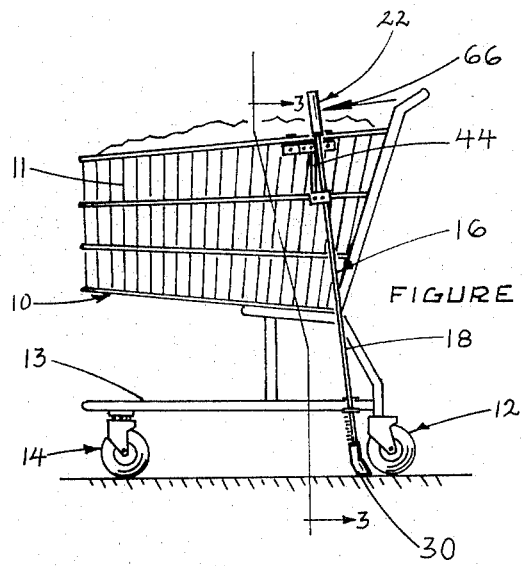
FIG. 2 is a view similar to FIG. 1 with the improved brake in the actuated condition.

The lower end of the body portion 18 is provided with a brake foot portion 30 for engaging the surface of the floor as shown in FIG. 2. This foot portion 30 is constructed similar to the handle portion 22, with an elongated tube 32 of resilient braking material mounted over the lower end of the body portion 18. As can be seen, only a portion of the length of the second tube 32 is positioned over the body portion 18, thus leaving a resilient extending portion 34 which is free to bend on contact with the surface of the floor during engagement. It should be realized, of course, that the second tube 32 can be constructed from any material suitable for use in contacting the floor to create a frictional braking force. The position of this tube 32 on the body portion 18 is again maintained by means of a washer 33 and cotter pin 35, which is inserted through a bore in the body 18.

The lower most portion of the body portion 18 is slidably attached to the undercarriage assembly 13 by means of a first mounting bracket 36. The bracket 36 is shown in FIG. 3 as having a J-shaped cross-section, with one of the circular cross-section members of the undercarriage assembly 13 positioned within the curve of the bracket 36. The bracket 36 is rigidly held in position on the assembly 13 by means of a socket head set screw 38, which is threaded through the bracket to engage and clamp the member of the undercarriage assembly. The bracket 36 is also provided with a bore 40 of a size to allow the body portion 18 to axially slide therethrough. A tension spring 42 is connected between the bracket 36 and the washer 33 to resiliently urge the brake assembly 16 to the position shown in FIG. 1.

The upper end of the body portion 18 is attached to and supported by a connecting arm 44. This arm 44 is constructed from rod material and is pivotally attached to the body portion by means of a hinge member 46 which is shown in detail in FIG. 4. The hinge member 46 has a U-shaped cross-section, which is positioned around the circular cross-section body portion 18, as shown. A socket head set screw 48, or the like, is threaded through the hinge member 46 to clamp and rigidly attach the hinge member 46 to the body portion 18. A pin 50 passes through the hinge member 46 and one end of the connecting arm 44, to pivotally attach the arm 44 to the hinge member 46.

The other end of the connecting arm 44 is in turn pivotally attached to the basket portion 11 of the cart 10 by means of an attachment bracket assembly 52, which is shown in detail in FIGS. 3 and 5. This bracket assembly 52 comprises a U-shaped hinge member 54 which is in turn attached to a stand-off bracket 56 by means of a fastener 58. A pivot pin 60 is provided in the hinge member 54, to pivotally attach the connecting arm 44 as shown. A pair of clamp members 62 is removably attached to the stand-off bracket 56 by means of fasteners 64 to clamp onto the basket portion 11 of the cart 10.

It is envisioned that other means of attaching the various elements together and onto the cart 10 could be used, without departing from the spirit and scope of the invention as defined in the attached claims.

DESCRIPTION OF THE OPERATION

Having thus described the structure of the present invention, a brief description of the operation thereof will be of assistance in pointing out the specific features and advantages thereof. Referring first to FIG. 1 which illustrates the brake assembly 16 of the present invention in the deactuated position attached to a cart 10, it can be seen that with the brake in the illustrated position, the cart 10 can be moved in a free and unrestrained manner as required.

Once the cart 10 is filled with merchandise and is moved to the parking lot, the operator can engage the brake by pushing the handle 22 in the direction of arrow 66, against the resilient force of spring 42 to move the brake foot 30 to the position shown in FIG. 2, with the foot 30 frictionally engaging the surface of the floor. The brake will then be held in the engaged position because of the rotation of the connecting arm 44 to a position past dead center as shown in FIG. 2. With the brake in this engaged position, the frictional contact between the brake foot 30 and ground surface will prevent movement of the cart 10 on reasonably inclined surfaces and in most winds. When it is desired to disengage the brake, the operator needs only to pull on the handle portion 22 in a direction in reverse to arrow 66.

It should be understood, of course, that the foregoing disclosure relates to only preferred embodiments of the invention and that numerous modifications or alterations may be made by those of ordinary skill in the art without departing from the spirit and scope of the invention as set forth in the appended claims.

I claim:

1. A parking brake for a cart having a basket portion and an undercarriage assembly with a plurality of rotatable wheels mounted on said undercarriage for movably supporting said cart on a support surface, said brake comprising:
   a. a rod mounted on said cart for pivotal and reciprocal movement relative thereto,
   b. brake foot means operatively attached to and carried by one end of said rod and movable thereby between a first position wherein said brake foot means frictionally engages said support surface and a second position wherein said brake foot means is spaced above said support surface,
   c. resilient spring means operatively associated with said brake foot means for resiliently urging said brake foot means in a direction to move toward said second position, and
   d. rod operator means operatively associated with said rod and said resilient spring means for movement between a first operator position wherein said brake foot means is in said first position and a second operator position wherein said brake foot is releasably held in said second position, said operator comprising a connecting arm with one end pivotally connected to said cart and the other end pivotally connected to said rod.

2. A parking brake as defined in claim 1 wherein said brake foot means comprises an elongated tubular member of resilient material, said tubular member being mounted on the lowermost end of said rod, said rod being inserted into the interior of said tubular member along a portion of the length of said tubular member.

3. A parking brake as defined in claim 1 additionally comprising at least one guide means attached to said cart to limit the movement of said rod with respect to said cart.

4. A parking brake as defined in claim 3 wherein said resilient spring means comprises a tension spring with one end attached to said brake foot means and the other end attached to said at least one guide means.

5. A parking brake as defined in claim 1 wherein handle means are attached to the uppermost end of said rod for gripping and applying force to said rod.

* * * * *